United States Patent [19]
Nies

[11] Patent Number: 5,494,156
[45] Date of Patent: Feb. 27, 1996

[54] DISC RETAINER FOR DISC STORAGE DEVICE

[75] Inventor: Joseph H. Nies, Concord, Mass.

[73] Assignee: Optima Precision Inc., Fitchburg, Mass.

[21] Appl. No.: 278,163

[22] Filed: Jul. 21, 1994

[51] Int. Cl.$^6$ .................................... B65D 85/30
[52] U.S. Cl. .................. 206/310; 206/308.1; 206/493
[58] Field of Search ................... 206/310, 308.1, 206/309, 493

[56] References Cited

U.S. PATENT DOCUMENTS

| | | | |
|---|---|---|---|
| 4,750,618 | 6/1988 | Schubert | 206/310 |
| 4,793,479 | 12/1988 | Otsuka et al. | 206/309 |
| 4,874,085 | 10/1989 | Grobecker | 206/310 |
| 5,251,750 | 10/1993 | Gelardi et al. | 206/493 |
| 5,284,248 | 2/1994 | Dunker | 206/310 |
| 5,381,894 | 1/1995 | Misterka et al. | 206/310 |
| 5,402,882 | 4/1995 | Bandy et al. | 206/310 |

FOREIGN PATENT DOCUMENTS

| 205589 | 8/1990 | Japan | 206/310 |
|---|---|---|---|
| 4057778 | 2/1992 | Japan | 206/310 |

Primary Examiner—David T. Fidei

[57] ABSTRACT

A disc storage device is provided with a panel (10) having a disc receiving surface (16) which includes a retainer disposed thereon for receiving a disc having a central opening (12). The disc retainer includes a circular arrangement of alternating spring fingers (22) and substantially rigid posts (26) extending upwardly from the disc receiving surface and through the disc central opening, to contact the central opening edge and maintain the disc in place during transport and storage. Enhanced structural integrity of the device can be provided by connecting the posts (26a, 26x) together at the central opening.

11 Claims, 5 Drawing Sheets

5,494,156

DISC RETAINER FOR DISC STORAGE DEVICE

BACKGROUND OF THE INVENTION

The present invention relates to disc storage cases which are employed for the storage and transport of round data discs, such as optically readable video discs and digital circuit discs known as CDs, and more particularly to that device which receives and retains the circular disc onto a substantially planar panel for retaining the disc against axial and radial movement during shipment and storage.

Various devices are known in which compact disc products are packaged for display and for protection of the compact disc or CD during its lifetime. Generally these cases or containers contain a disc holding panel which is mounted between a lid and a base, the disc holding panel containing means for receiving and retaining the circular disc on one surface thereof.

Various arrangements of this type have been proposed for retaining a CD disc in a storage device, many of which have proved successful and are to be found in the marketplace today. The primary objective of each of these devices is to support the disc at its central opening against both radial and axial movement in the event of a sudden shock produced during shipping or handling by the user. Additionally, it is highly desirable to manufacture the disc retaining device of a plastic material which is transparent, for display purposes.

It is therefore an object of the present invention to provide a disc storage device for receiving and retaining a circular disc which is effective to maintain the disc in position during transport and storage.

A further object of the invention is to provide a storage device for receiving and retaining a circular disc, such as a CD, which may be manufactured of a transparent plastic, such as polystyrene which is economical to construct.

A further object of the present invention is to provide a transparent plastic device of lower cost than other transparent plastic devices and which is less breakable and will support the CDs if the device is dropped on one of its sides.

SUMMARY OF THE INVENTION

The above objects and other objectives which will become apparent as the description proceeds are accomplished by providing a disc storage device for receiving and retaining a circular disc having a circular opening located at the center thereof which device comprises a substantially planar panel having an upwardly facing disc receiving surface. A circular opening is formed in the panel near the center thereof and a plurality of upwardly extending spring fingers are formed adjacent the panel opening for contacting the panel edge of the disc at the disc circular opening. A plurality of upwardly extending posts are formed adjacent the panel opening for contacting the edge of the disc at the disc circular opening and the spring fingers extend upwardly from the disc receiving surface a height greater than the height of each of the posts above the disc receiving surface.

The height of each of the spring fingers above that of the posts is generally in the area of 0.6 millimeters to 1.3 millimeters and the spring fingers and the post are generally arranged in a circular array about the circular opening formed in the panel, in which case the spring fingers and the post may be alternated one with the other over the circular array.

At least a portion of each of the spring fingers extends radially outwardly from the panel circular opening a distance beyond that of the posts and the posts may be extended into the panel circular opening and interconnected one to the other at the center of the opening.

With the construction of the present invention the disc storage device the manufacturer can reduce costs while still providing for adequate holding of CDs during transport, multiple dropping and handling ease of the end user. The end user can easily remove and replace a CD and a CD can be easily mounted on it with automatic packaging equipment. The use of transparent plastic provides additional areas where information, instructions and other data can be placed in the case. The structure of the present invention provides an area for holding the disc which allows drops in any 360° direction. The device can be manufactured without using expensive clear rubber or other additives to provide the requisite strength.

BRIEF DESCRIPTION OF THE DRAWING

Reference is made to the accompanying drawing in which there is shown an illustrative embodiment of the invention from which its novel features and advantages will be apparent, wherein.

DESCRIPTION OF THE PREFERRED EMBODIMENT

Figure 1:
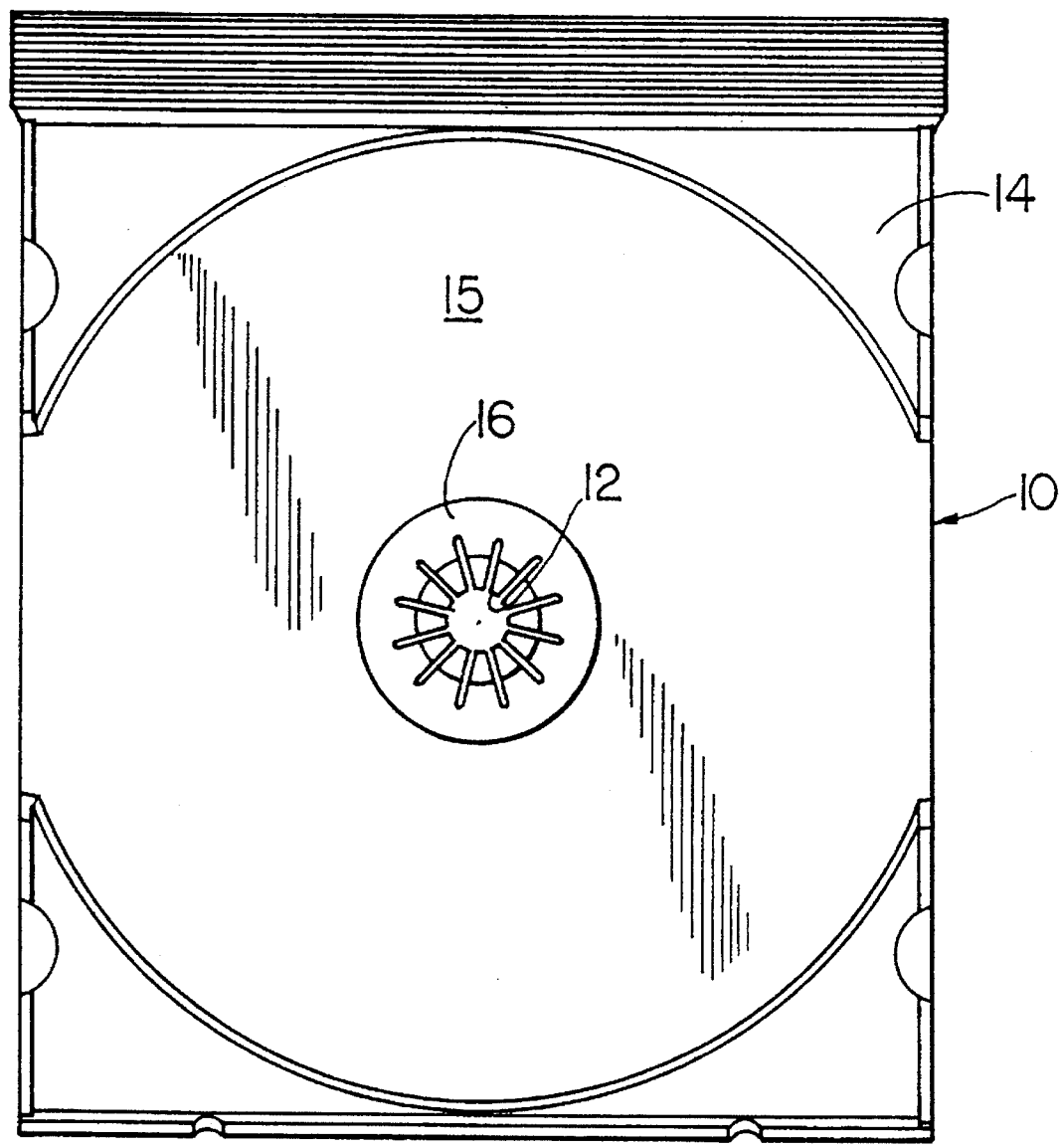
FIG. 1 is a top plan view showing the disc receiving surface of a panel employed in a data disc storage device having a disc retainer constructed in accordance with the teachings of the present invention.
Figure 2:
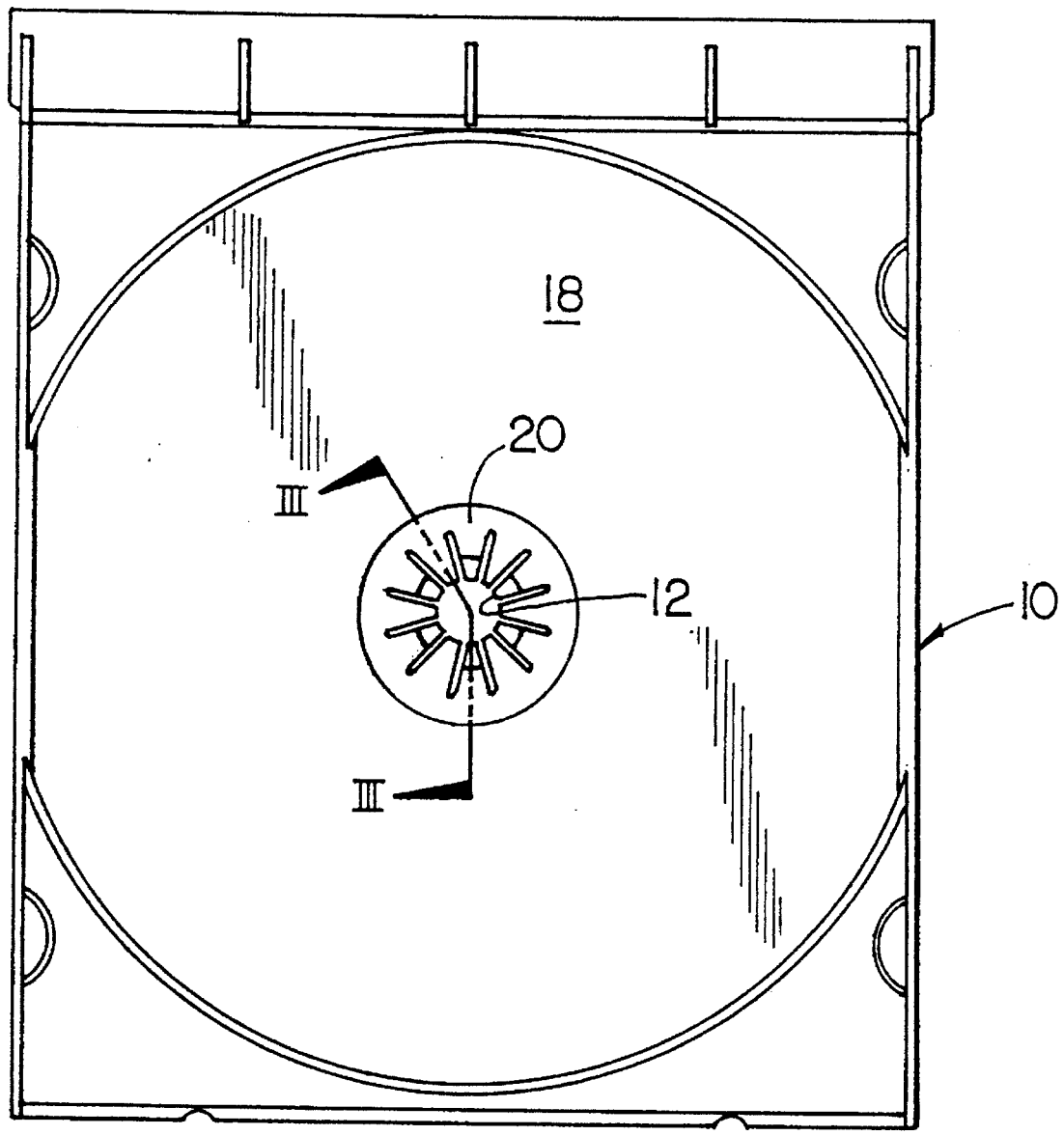
FIG. 2 is a bottom plan view of the panel of FIG. 1 showing details of the disc retainer.

Referring now to the drawing and in particular to FIGS. 1 and 2 there is shown a disc storage device in the form of a panel 10 having a circular opening 12 formed in the panel near its center. As best shown in FIG. 1 a disc receiving upper side 14, a recessed surface 15 defines the area into which the disc is received, and a circular raised surface 16 which supports a disc in the axial direction by contacting that portion of the disc which does not contain data. The portion containing the data is thereby supported above and out of contact with the surface 15, as is well known in the art.

The rear view of the panel 10, as shown in FIG. 2 shows a lower surface 18 of the circular disc receiving area which extends downwardly in the panel 10 and a circular surface 20 which extends upwardly and is the opposite surface of the portion containing the surface 16 and forming the structure supporting the disc, as set forth above.

As is well known in the art, the disc storage panel 10 is generally combined with a base member and a lid member to complete the construction of the storage device. However, these elements are not herein shown as they may take a number of forms, and are not considered to be a part of the present invention.

Figure 3:
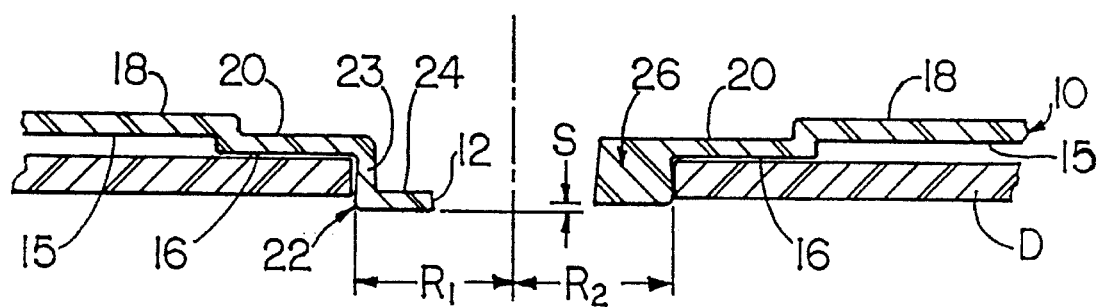
FIG. 3 is a fragmentary elevational sectional view of the retainer of FIGS. 1 and 2 taken along the line III—III of FIG. 2 showing on an enlarged scale further details of the disc retainer of FIGS. 1 and 2 having a data disc retained thereon.
Figure 4:
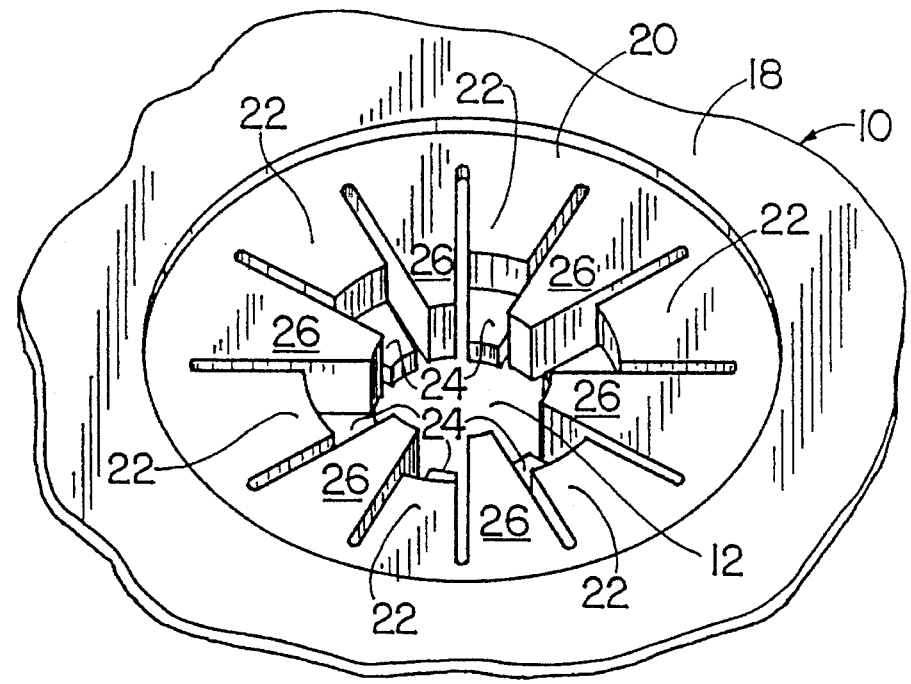
FIG. 4 is a fragmentary bottom perspective view showing elements of the retainer of FIGS. 1 through 3 taken on an enlarged scale.
Figure 5:
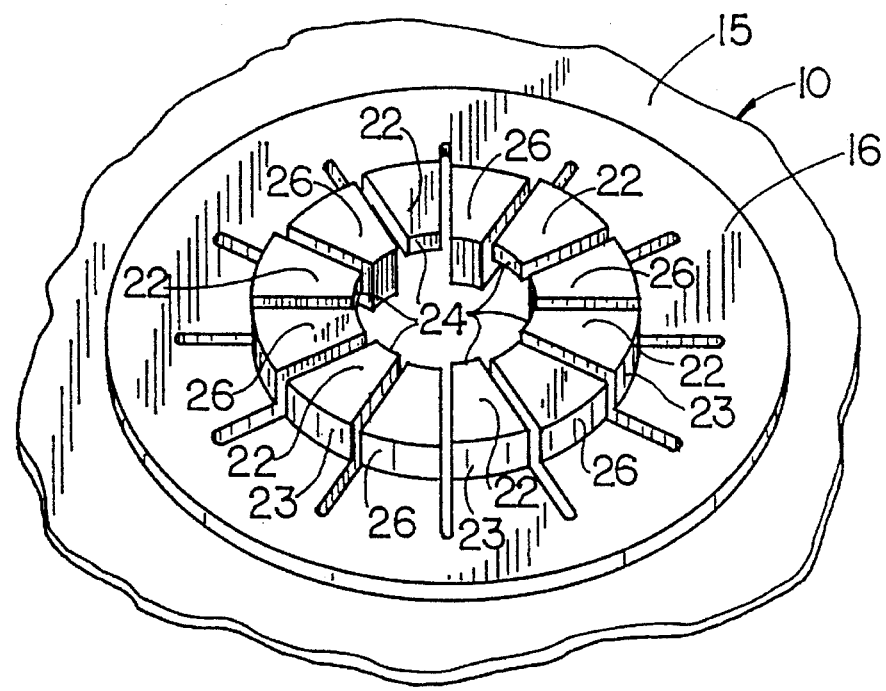
FIG. 5 is a fragmentary top perspective view showing those retainer elements of FIG. 4.

Referring now to FIGS. 3, 4 and 5, a plurality of spring fingers 22 extend upwardly from the surface 16 and are arranged adjacent the panel opening 12 for contacting an edge of the circular opening in a disc D as shown in FIG. 3, when the disc is received onto the panel 10. Each of the spring fingers comprises an upwardly extending leg 23 having an arcuate external surface and an inwardly projecting tab 24.

Alternating with the spring fingers 22 about the periphery of the panel opening 12, is disposed a plurality of upwardly extending posts 26 as shown in FIG. 4. The posts 26 extend downwardly and are flush with the bottom surface of the support surface 20 throughout there lengths, and also have a arcuate surface for receiving the disc D, as best shown in FIG. 3. It should therefore be evident that the posts 26 are constructed, as shown, to be a rigid support for the disc D in the radial direction of the opening 12 while the spring fingers 22 are of a lesser rigidity and are constructed from the chosen plastic material of the panel 10 to flex radially inwardly of the opening 12 to receive the opening in the disc D. As further shown in FIG. 3, each spring finger 22 is constructed such that at least a portion of each spring finger extends radially outwardly from the center of the opening 12 a distance R1 which is greater than the distance R2 which is the extent radially outwardly of each of the posts 26.

Referring still to FIG. 3, it should further be noted that each of the posts 26 is of a lesser height than each of the spring fingers 22 by a distance S, which is generally in the area of 0.6 to 1.3 millimeters.

In assembling the disc D onto the panel 10, the opening in the disc is placed adjacent the plurality of spring fingers 22 and posts 26, the edge of the opening in the disc contacting first the tabs 24 of the spring fingers due to the offset S of the spring fingers from the posts 26. The spring fingers 22 are allowed to move inwardly due to the interfitting engagement of the opening in the disc D with the portion 23 of each of the spring fingers and may be forced downwardly into the position shown in FIG. 3 wherein the opening in the disc D contacts not only the spring fingers 22 but the posts 26. During transportation or storage any sudden force or shock in the radial direction with reference to the opening 12 will be absorbed by the posts 26 thereby lessening the probability of the spring fingers 22 being shattered as may be the case if the spring fingers alone were employed to retain the disc D onto the panel 10.

Figure 6:
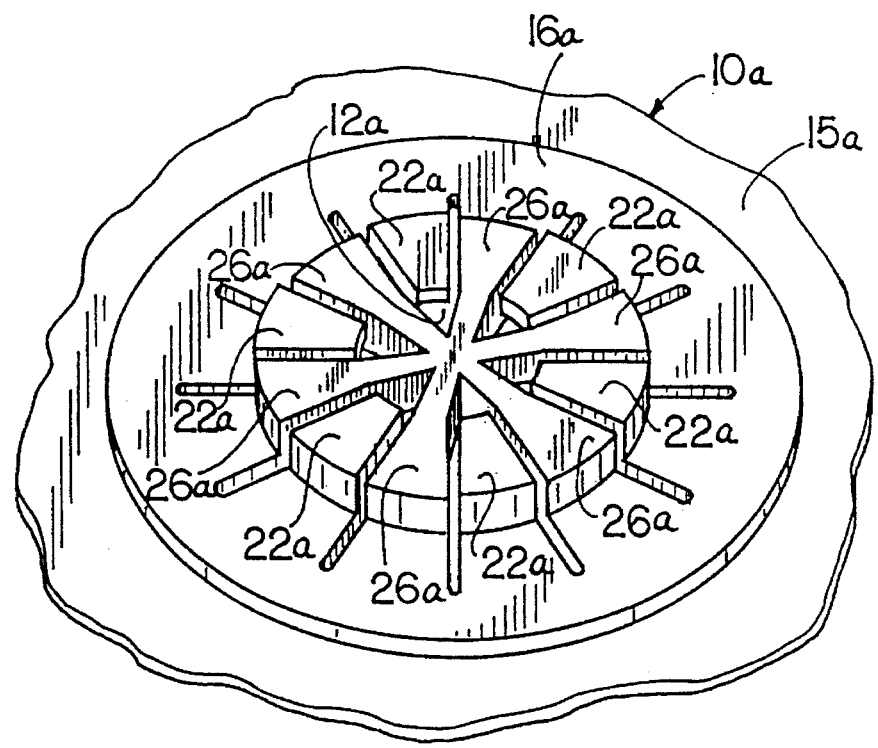
FIG. 6 is a fragmentary top perspective view similar to FIG. 5 showing an alternate embodiment of the structure of FIG. 5.

If it is desired to increase the rigidity of the posts 26, reference should be had to FIG. 6 of the drawing where panel 10a comprises an upper surface 15a, disc supporting surface 16a and a plurality of spring fingers 22a disposed about an opening 12a, the surfaces 15a, 16a, the opening 12a and the spring fingers 22a being identical to the surfaces 15, 16 spring fingers 22 and circular opening 12 as defined with regard to the panel 10 described above. However, in the present embodiment the plurality of posts 26a are joined at the center of the circular opening 12a to increase the rigidity of the posts and thereby insure that the posts 26a provide a rigid reaction to any excess loading in the radial direction with reference to the opening 12a, and to thereby prevent the excess loading or shock from being reacted by the spring fingers 22a.

Figure 7:
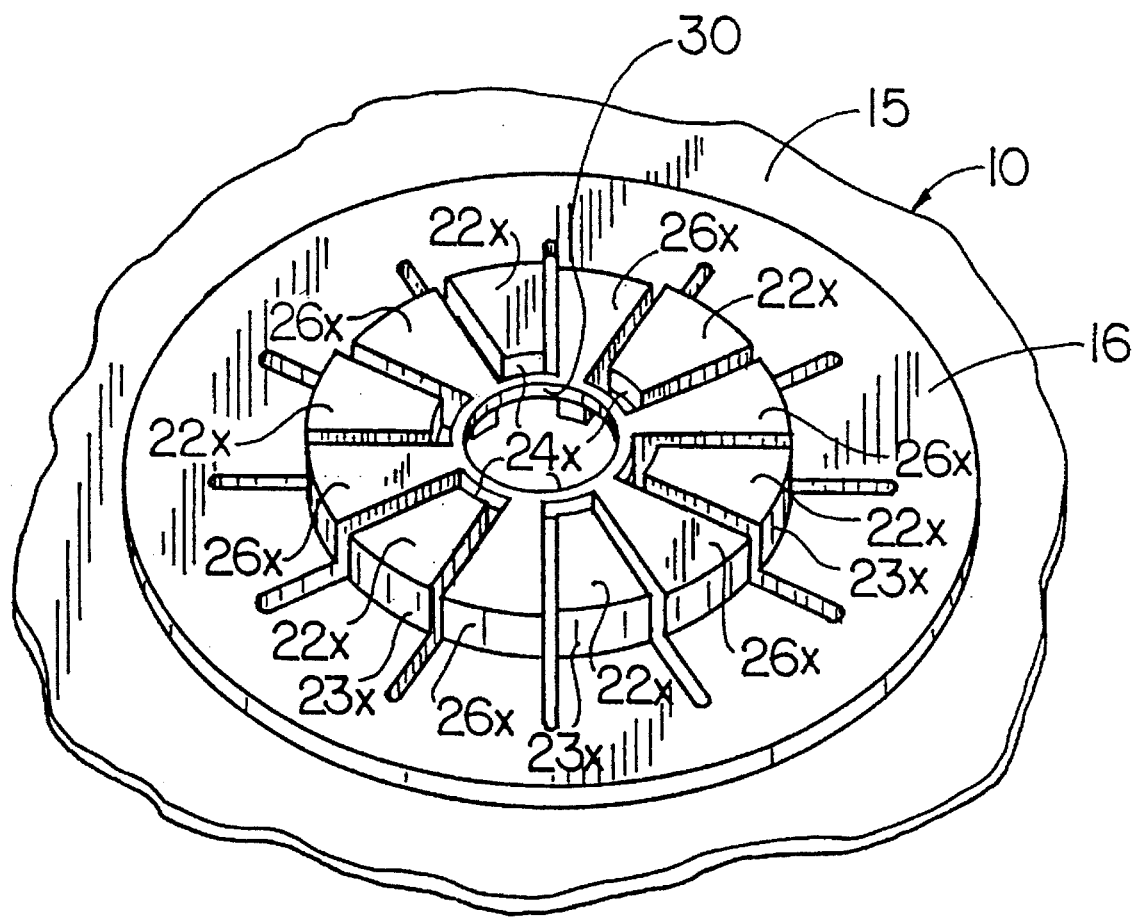
FIG. 7 is a fragmentary top perspective view similar to FIG. 5 showing another alternate embodiment of the structure of FIG. 5.

FIG. 7 shows another means for enhancing the rigidity of the posts. In this embodiment the panel 10x comprises an upper surface 15x, disc supporting surface 16x and a plurality of spring fingers 22x disposed about an opening 12x, the surfaces 15x, 16x, the opening 12x and the spring fingers 22x being identical to the surfaces 15, 16 spring fingers 22 and circular opening 12 as defined with regard to the panel 10 described above. However, in this embodiment the plurality of posts 26x are joined by a ring 30 to increase the rigidity of the posts and thereby insure that the posts 26x provide a rigid reaction to any excess loading in the radial direction with reference to the opening 12x and to thereby prevent the excess loading or shock from being reacted by the spring fingers 22x.

While it is apparent that changes and modifications can be made within the spirit and scope of the present invention, it is my intention, however, only to be limited by the appended claims.

As my invention I claim:

1. A disc storage device for receiving and retaining a circular disc having a circular opening formed at the center thereof, said device comprising:

a substantially planar panel having an upwardly facing disc receiving surface;

a circular opening formed in said panel near the center thereof;

a plurality of upwardly extending spring fingers formed adjacent said panel opening for contacting the edge of said disc at said disc circular opening; and a plurality of upwardly extending posts formed adjacent said panel opening for contacting the edge of said disc at said disc circular opening;

said spring fingers extending upwardly from said disc receiving surface a height greater than the height of said posts above said disc receiving surface, said spring fingers and said posts being radially disposed in a circular array around said circular opening in said panel.

2. A disc storage device as set forth in claim 1 wherein the height of said spring fingers above said posts is in the area of 0.6 to 1.3 millimeters.

3. A disc storage device as set forth in claim 1 wherein said spring fingers and said posts are alternated one with the other in circular array.

4. A disc storage device as set forth in claim 1 wherein at least a portion of each of said spring fingers extends radially outwardly from said panel circular opening a distance beyond that of each of said posts.

5. A disc storage device as set forth in claim 1 wherein said posts are extended into said panel circular opening and are interconnected one to the other at the center of said opening.

6. A disc storage device as set forth in claim 2 wherein said spring fingers and said posts are arranged in a circular array about said circular opening formed in said panel.

7. A disc storage device as set forth in claim 6 wherein said spring fingers and said posts are alternated in said circular array.

8. A disc storage device as set forth in claim 7 wherein at least a portion of each of said spring fingers extends radially outwardly from said panel circular opening a distance beyond that of each of said posts.

9. A disc storage device as set forth in claim 8 wherein said posts are extended into said panel circular opening and are interconnected one to the other at the center of said opening.

10. A disc storage device as set forth in claim 7 wherein said posts are interconnected one to the other by a ring about said opening.

11. A device as set forth in claim 1 wherein the panel is formed of a transparent plastic.

* * * * *